Jan. 4, 1949.　　　　　P. KRUSE　　　　　2,458,008
CAN-BODY MAKER

Filed June 16, 1944　　　　　　　　　　　　8 Sheets-Sheet 3

INVENTOR.
PETER KRUSE
BY
G. R. Thompson
ATTORNEY

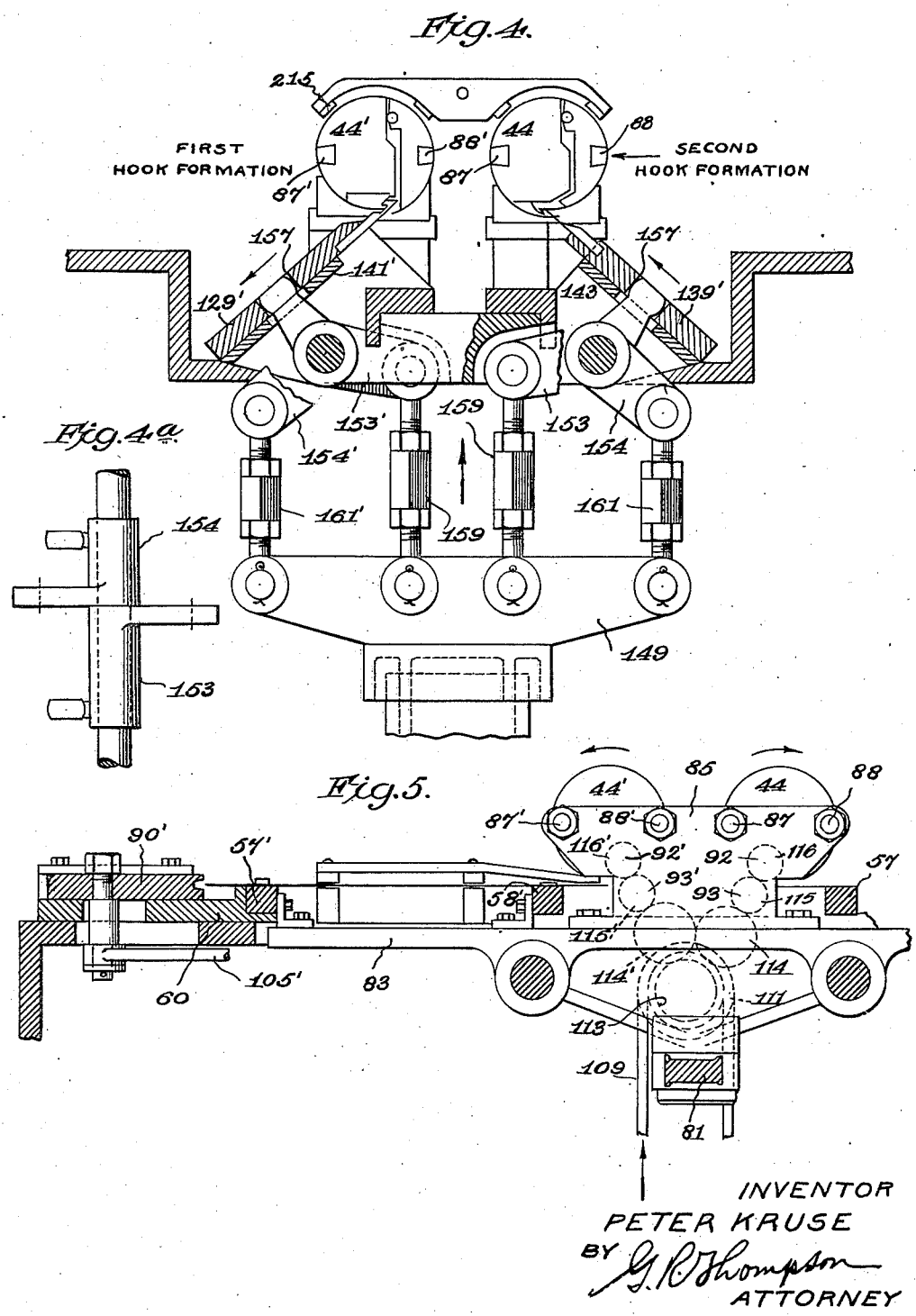

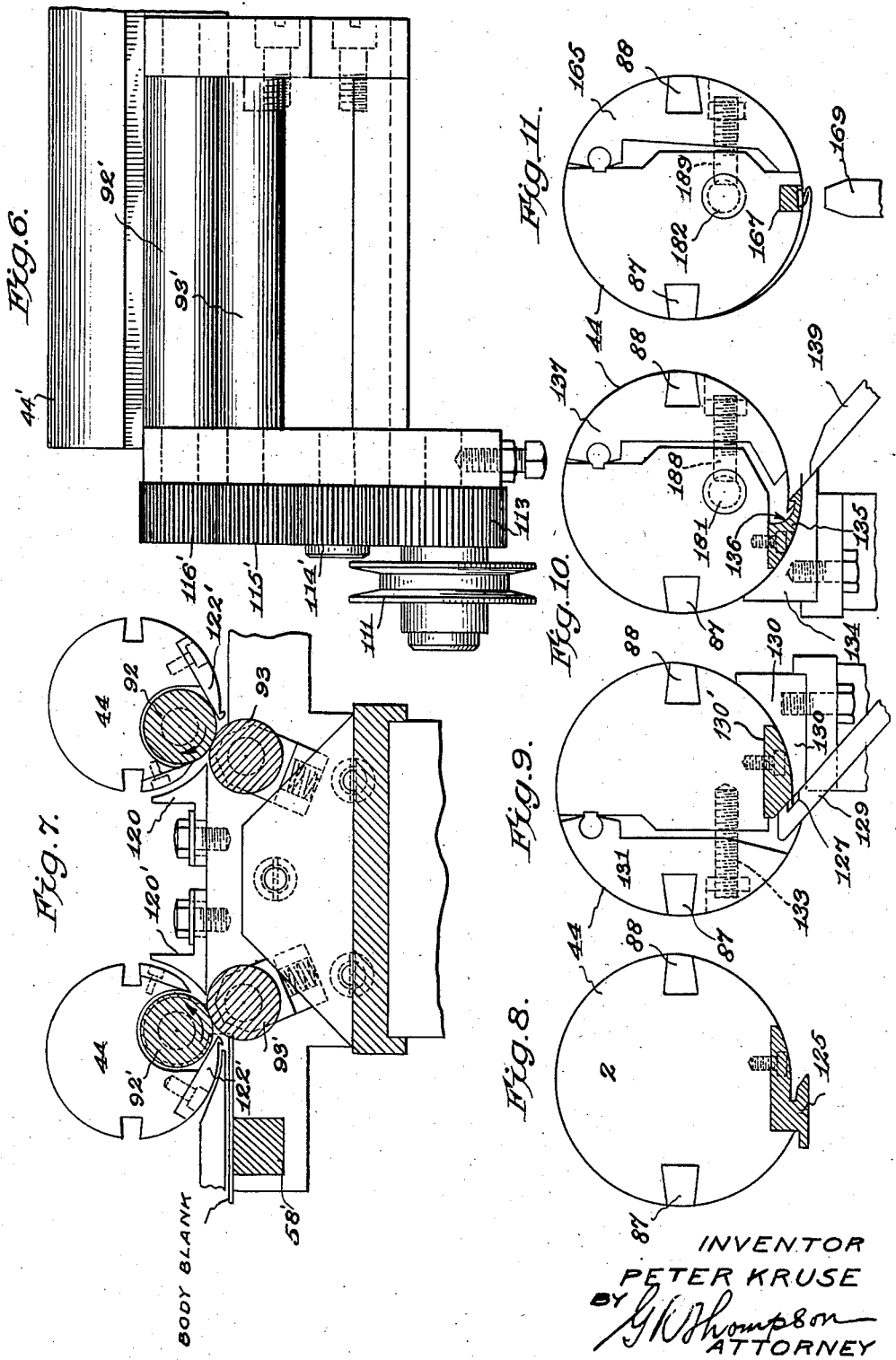

Jan. 4, 1949.          P. KRUSE                2,458,008
                     CAN-BODY MAKER
Filed June 16, 1944                      8 Sheets-Sheet 6
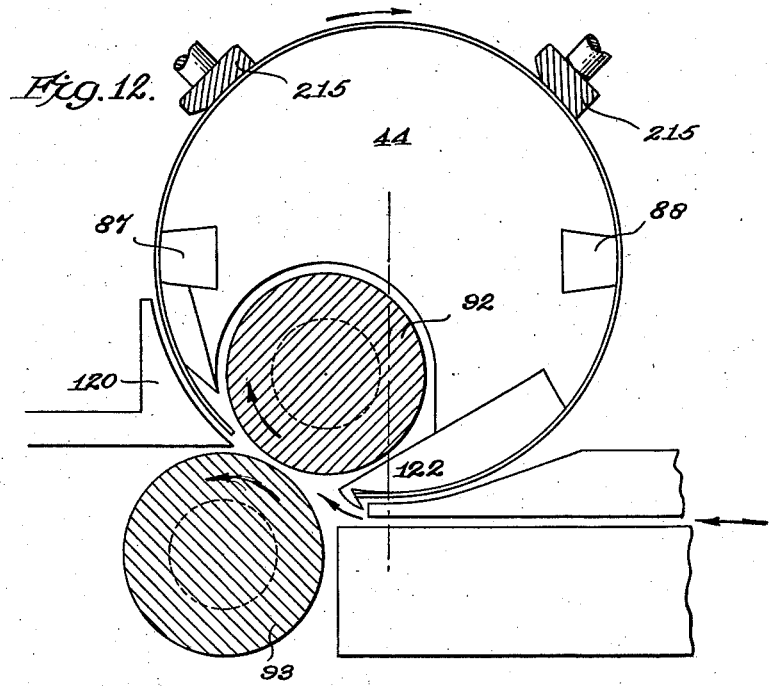
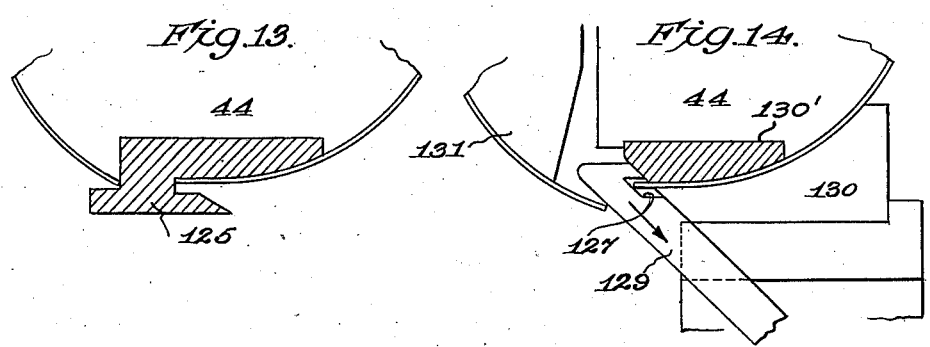
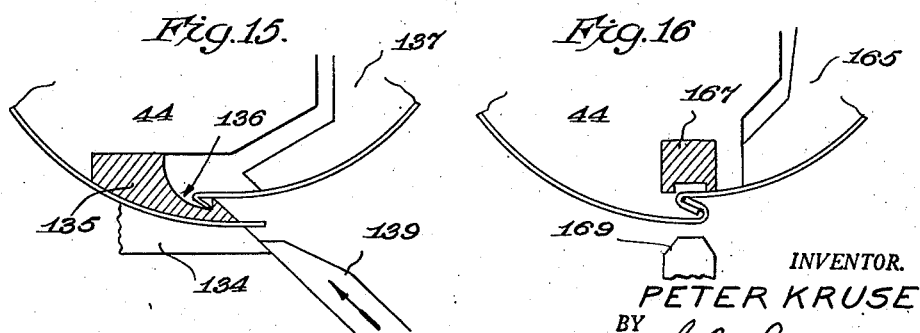
INVENTOR.
PETER KRUSE
BY
*G.R.Thompson*
ATTORNEY

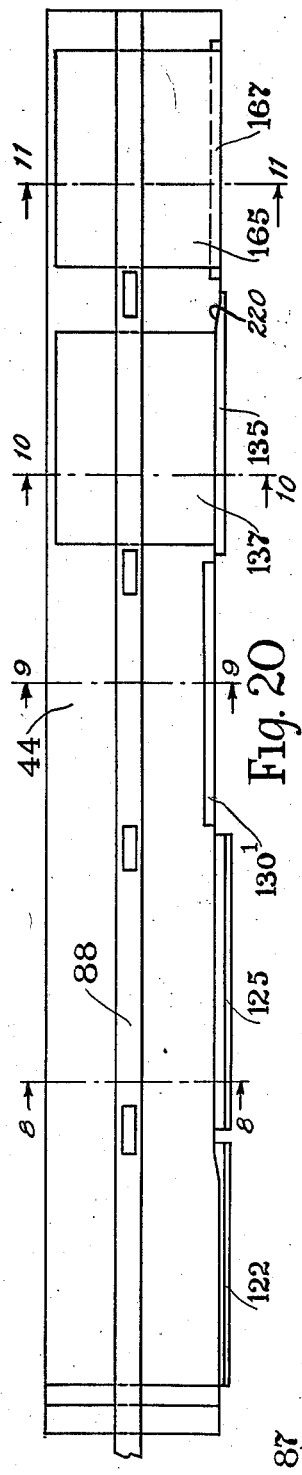
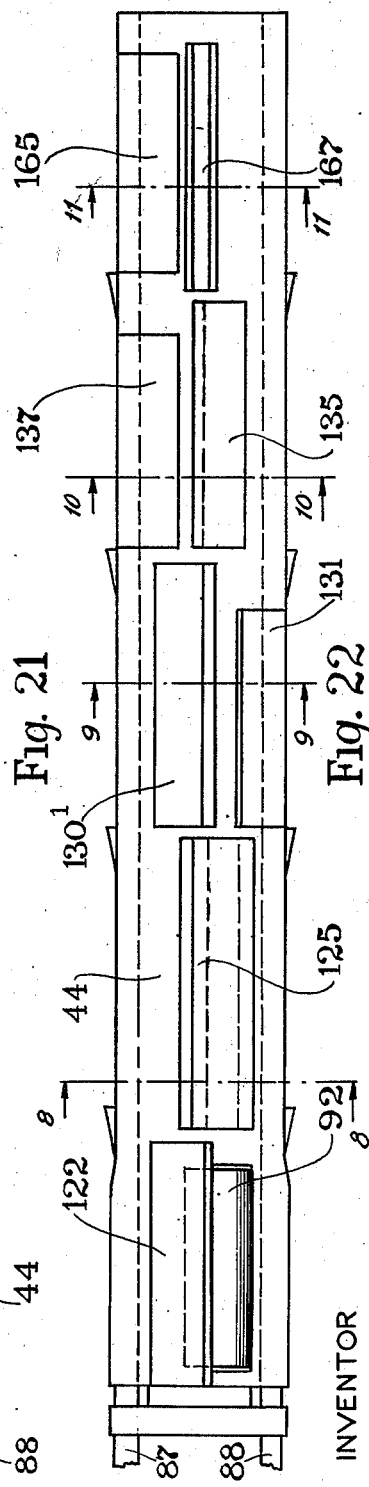
Fig. 20  Fig. 21  Fig. 22

Patented Jan. 4, 1949

2,458,008

UNITED STATES PATENT OFFICE 2,458,008

CAN-BODY MAKER

Peter Kruse, Brooklyn, N. Y., assignor to Lima-Hamilton Corporation, Hamilton, Ohio, a corporation of Virginia Application June 16, 1944, Serial No. 540,597

4 Claims. (Cl. 113—8)

This invention relates to can-body makers, and provides improvements therein.

The invention provides a high performance machine. It provides a duplex-type of machine which will make twice the number of can-bodies as present-day single-line machines, and yet occupy no more floor space than such a single-line machine. The invention comprises a hook-forming mechanism of novel construction, the moving parts of which work with short motions, which favors high speed, accurate operation and a close arrangement of parallel horns. The present hook-forming mechanism is a valuable and novel element of a body maker. The body maker construction is one which provides speed, accuracy and reliability. The mechanism also operates to form a more perfect can-body than heretofore; the bending of the blank starts at the edge, and the lapped portions of the blank at the side seam lie closer together than heretofore.

The invention may also be embodied in a single-line body maker.

Other features of improvement will be pointed out in the description which follows.

The invention further comprises elements and sub-combinations which may be embodied generally in body makers.

An embodiment of the invention is illustrated in the accompanying drawings. The invention may receive other embodiments than that specifically illustrated and described.

Referring to said drawings.

Figure 1:
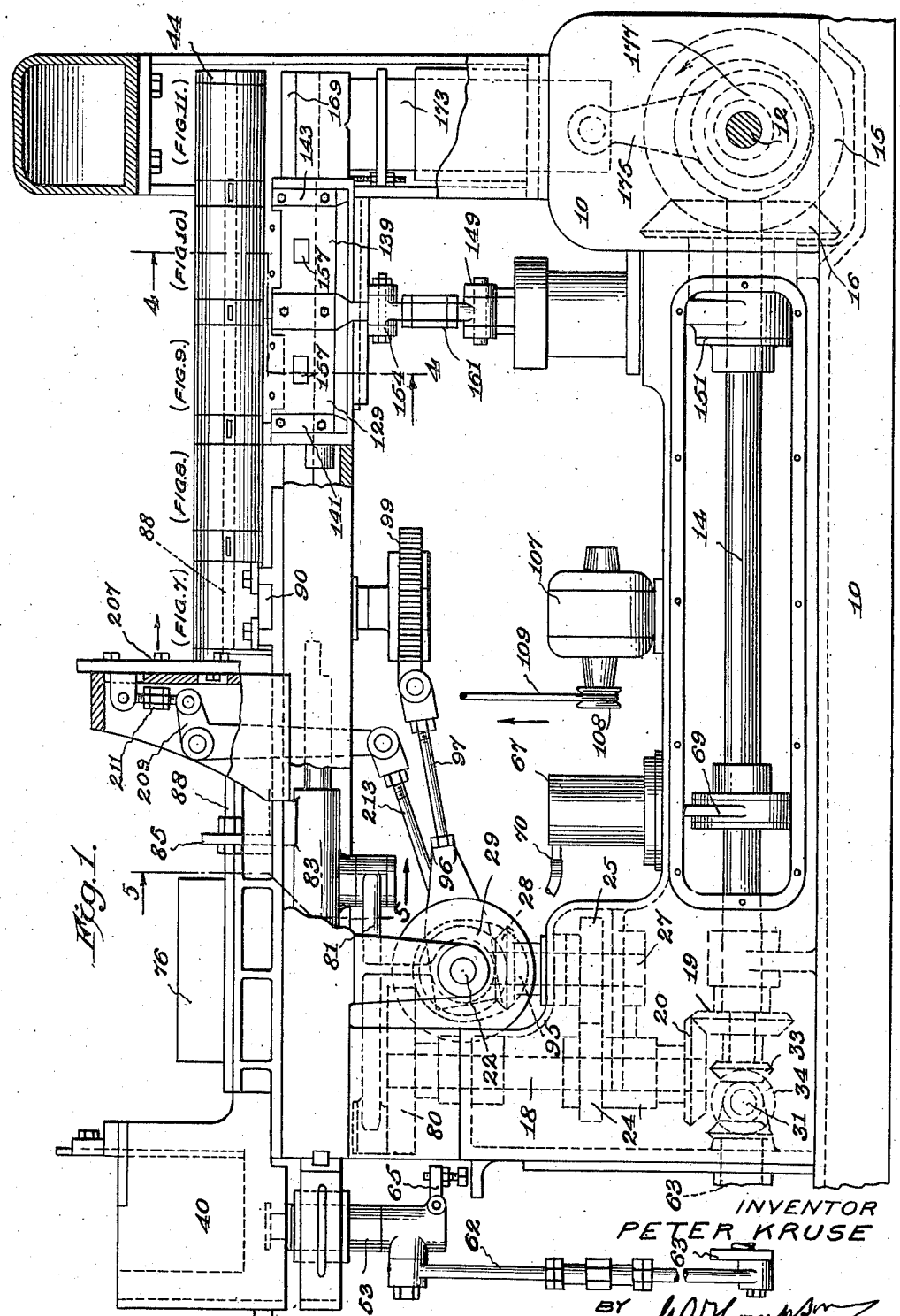
Fig. 1 is a view in side elevation and partly in section, of a body maker according to my invention.
Figure 2:
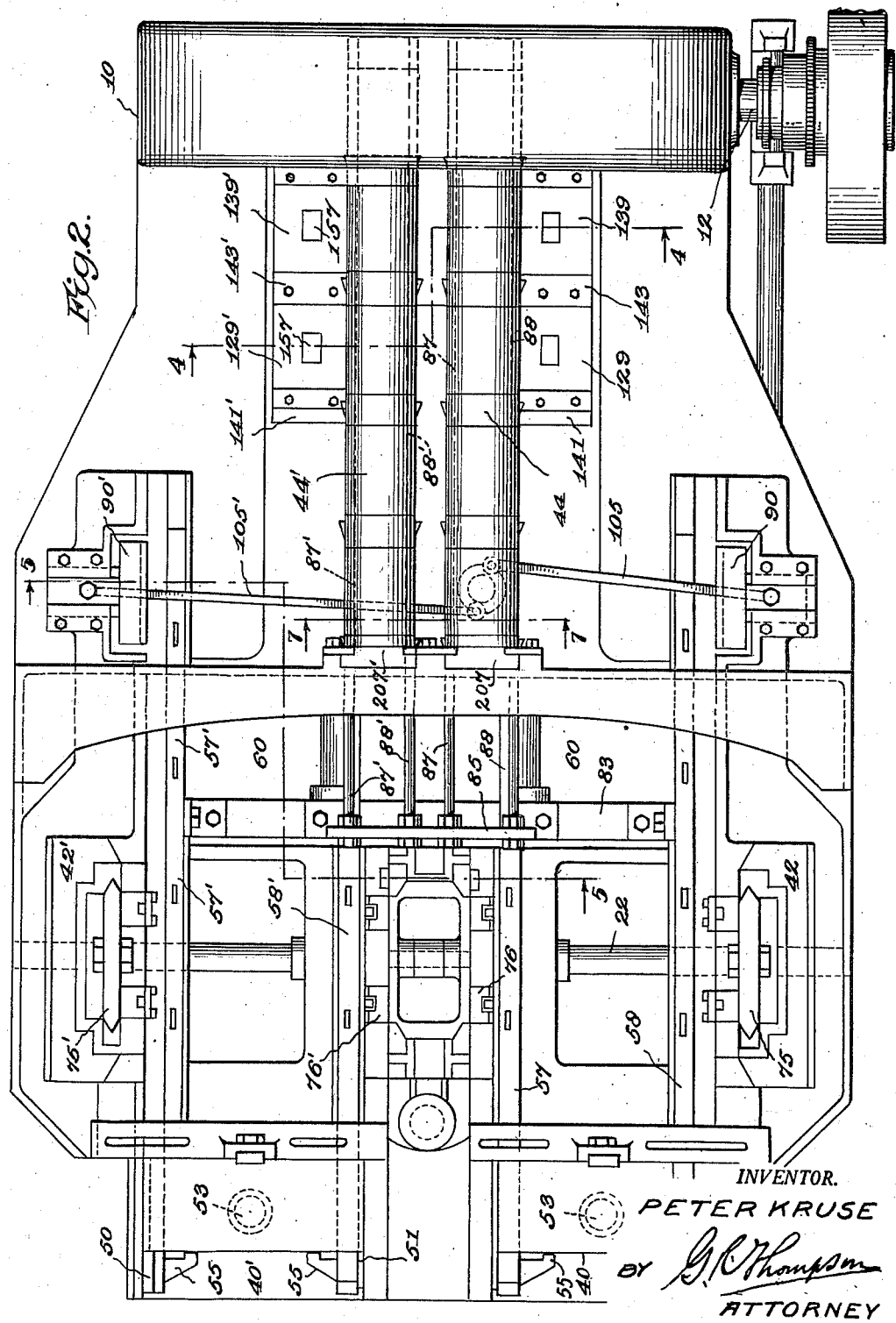
Fig. 2 is a top plan view.

Fig. 4 is a cross-section on the line 4—4, Fig. 1, as well as on the line 4—4, Fig. 2, the horn at both the first and second hook forming operations being shown; Fig. 4a is a detail view illustrating the bellcranks 153, 154 of the hook-forming mechanism.

Fig. 5 is a cross-section on the line 5—5, Fig. 1; as well as on the line 5—5, Fig. 2;

Figs. 6 and 7 are detail views of parts of the mechanism for wrapping and bending the body blanks around the horn; Fig. 7 being a cross section through the middle part of the machine, on the line 7—7 Fig 2; and Fig. 6 being a view in side elevation of parts of the mechanism for wrapping the body blanks around the horn, from a viewpoint between the two horns, and with parts immediately in front of the rollers omitted, the purpose of the figure being mainly to show the drive for the rollers.

Figs. 8, 9, 10 and 11 are detail cross section views somewhat diagrammatic in character at successive positions of the body-blank, beyond the position shown in Fig. 7, along a horn; Fig. 8 being a section on the line 8—8 Figs. 20 and 22 illustrating means for positioning the body-blank, with the leading edge positioned beyond the vertical mid-plane running through the axis of the horn; Fig. 9 is a section on line 9—9 Figs. 20 and 22 and illustrates mechanism at the first hook-forming position; Fig. 10 is a section on line 10—10 Figs. 20 and 22 and illustrates means at the second hook-forming position; and Fig. 11 is a section on line 11—11 Figs. 20 and 22 and illustrates mechanism at the side-seam closing position, the hooks being interlocked in passing from the position Fig. 10 to the position Fig. 11. For convenience of reference, the location of these mechanisms along the horn, Fig. 1, has been indicated by legends Figs. 7–11 in parenthesis, above the horn.

Figure 19:
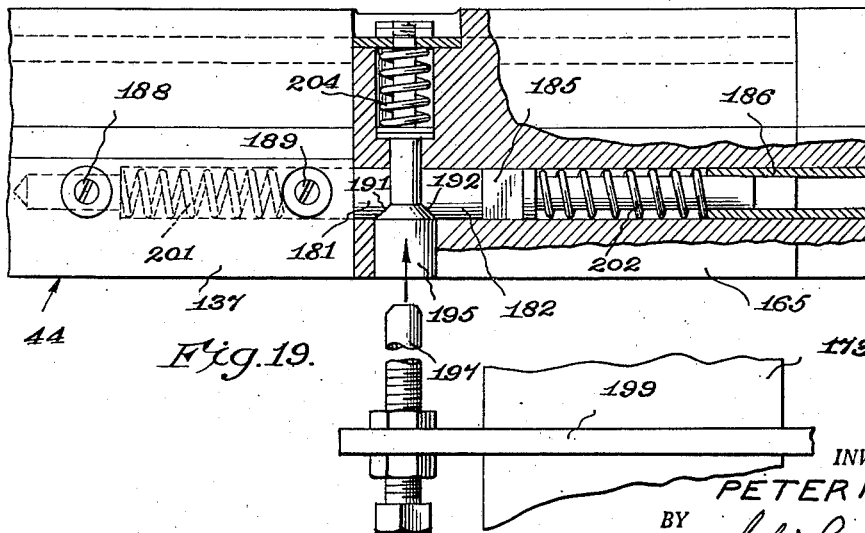
Figures 17, 18:
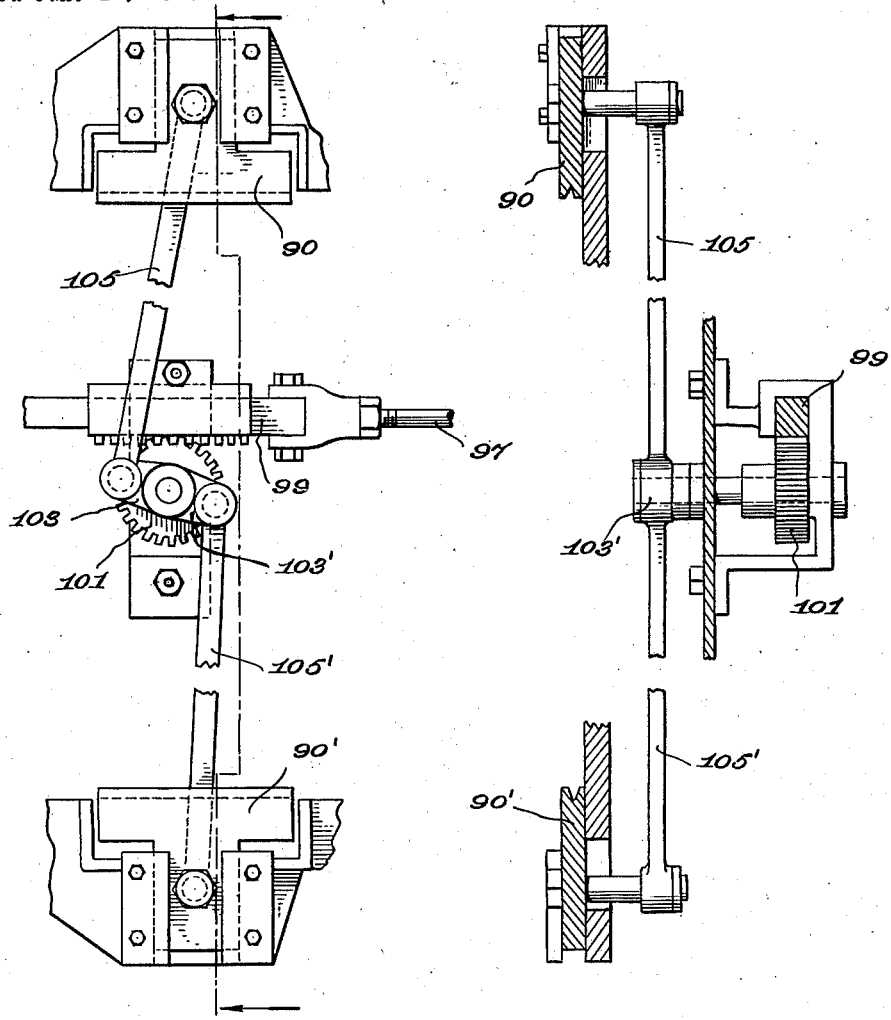

Figs. 12–16 inclusive are views similar to Figs. 7–11 inclusive, considerably enlarged;

Figs. 17 and 18 are respectively a top plan view and a transverse sectional view of pushing mechanism for initiating the movement of the can body blanks from the feed tables to the feed-rollers illustrated in Figs. 6 and 7;

Fig. 19 is a view partly in side elevation and partly in vertical section of a part of a horn and its expanding means, and related to the views of Figs. 10 and 11.

Figs. 20, 21 and 22 are views showing in detail the horn shown generally in Figs. 1 and 2, Fig. 20 being a view thereof in side elevation, Fig. 21 a top plan view and Fig. 22 a bottom plan view.

Referring to said drawings, numeral 10 designates a frame in which are journalled suitable shafts for driving the parts of the mechanism, as a cross-shaft 12; a longitudinal shaft 14, driven from shaft 12 through bevel gears 15, 16; a vertical shaft 18, driven from shaft 14 through bevel gears 19, 20; and a transverse shaft 22, driven from shaft 18 through spur gears 24, 25, a short vertical shaft 27, and bevel gears 28, 29. A cross-shaft 31 may be driven from shaft 14 through bevel gears 33, 34.

The body maker illustrated is a duplex machine, i. e., it has two hoppers 40, 40', two sets of notchers 42, 42', and two sets of horns 44, 44' with associated hook-forming and side-seam closing mechanisms. In the following description one line of mechanism will be particularly described, with appropriate reference to parts in common and special relationships.

The blank feed mechanism is of known construction and comprises ledges 50, 51 at the opposite sides of a hopper, and a vacuum device or sucker 53 reciprocated toward and from the bottom of the hopper, drawing the lowermost blank down, separating it from the others in the hopper, in position to be engaged by feed-fingers 55 on feed-bars 57, 58 and fed forward, step by step, along a feed-table 60. The sucker 53 may be driven from cross-shaft 31 through a pitman rod 62, crank on crank shaft 63, and bevel gears on shafts 63 and 31. Numeral 65 designates a device for breaking the vacuum in the sucker 53 on the down stroke. Suction may be provided by a pump 67, driven by an eccentric 69 on shaft 14, and connected with sucker 53 by a hose 70. The mechanism for feeding body-blanks out of and away from the hopper 40' may comprise parts similar to those described above in reference to hopper 40.

After leaving hopper 40, the body-blanks are advanced stepwise by feed-bars 57, 58, to a notcher 42, where notches appropriate for a side-seam are cut in opposite sides of the blank by suitable reciprocatory dies 75, 76. The notching dies 75, 76, may be reciprocated by suitable means (not shown) from cross-shaft 22. The notching means 42 is of a well-known construction. The notcher 42' may be similar to notcher 42.

Feed-bars 57, 58 are conveniently reciprocated from shaft 18 through a crank-disk 80, pitman rod 81, and a cross-head 83. The cross-head is common to the feed-bars of a duplicate line in a duplex machine. Cross-head 83 has a centrally located bracket 85 (between the feed-tables of a duplex machine) to which feed-bars 87, 88 are attached, and to which feed-bars 87', 88', of a duplex machine are also attached.

From the notchers 42 (and 42') the notched body-blanks are advanced by the feed-bars 57, 58, by one or more steps to a position for feeding onto horn 44 (corresponding to horn stations Fig. 7). In this position, the outside edge-portion of a can body blank is acted on by a pusher 90 (90') (Figs. 2, 5, 17 and 18), which gives the body-blank a short push transverse to its line of feed by feed-bars 57, 58, bringing the opposite body-edge-portion into the bite of feed-rollers 92, 93 (92', 93') (Figs. 5, 6, 7, 12), which act to bend the blank, wrap it around horn 44, and position it on said horn.

A pusher 90', similar to 90, and feed-rollers 92', 93', similar to 92, 93, are provided for a duplex machine.

Pusher 90 (or 90 and 90') is operated in a suitable manner, conveniently from shaft 22 through a cam and follower 95, 96, (Fig. 1) connecting rod 97, rack 99, pinion 101, (Fig. 17) arm 103 on pinion 101, and connecting rod 105. An arm 103' and a connecting rod 105', similar to 103 and 105, are provided for a duplex machine.

Feed-rollers 92, 93, one of which is located within the circumference of the horn, are driven at high speed by suitable means. Advantageously this is done by an electric motor 107 mounted on the frame of the machine, driving the rollers at about 2000 turns per minute by means of a pulley 108, belt 109, pulley 111 (Figs. 5 and 6) and spur gears 113, 114, 115, 116, (Fig. 5) the arrangement of the gears being such as to reverse the direction of turning of rollers 92 and 93. Feed-rollers 92', 93', for a duplex machine, are driven by similar spur gears meshing with gear 114', the arrangement being such that the feed-in direction of the rollers 92', 93' is opposite to that of 92, 93.

The axes of feed-rollers 92, 93 (likewise 92', 93') are offset from a vertical plane so as to start the rounding of the body-blank immediately at the in-feeding edge. By rounding the body-blank immediately from the edge, the lapped portions of the side-seam lie close when the side-seam is closed, and this makes a superior can, because less solder seeps between the lapped parts, and consequently there is less liability for leakage to develop in the completed cans. The aforesaid arrangement improves the form and appearance of the completed can-bodies. The bending is assisted by the action of the arcuate guides 120, (120') against which the body-blanks are projected at high speed.

The body-blanks are bent and wrapped around the horn 44 by the feed-rollers 92, 93, the following-edge running out from the bite of the rollers 92, 93, just prior to the entering-edge reaching a stop 122 (Figs. 7 and 12), which may have the form of a hook, the body-blanks one after another being uniformly stopped and therefore uniformly positioned on horn 44 following the wrapping and bending action of rollers 92, 93. The stop 122 is positioned so that the entering edge of the body-blank is stopped after it has passed a vertical plane which passes through the axis of horn 44 (see Fig. 12—the dot and dash line which passes through the axis of the horn). The purpose of this is to attain at the side-seam closing position a locking of the hooks which are subsequently formed, in the vertical axial plane of the horn, so as to avoid circumferential movement of the rounded blank on the horn to attain such a position.

From the bending position, Fig. 7, the rounded body-blank is advanced step wise by the feed-bars 87, 88, to a position (Figs. 8 and 13) where the notched edges are brought closer together and the edge which is not to have a hook formed thereon at the next station, spaced radially somewhat further from the axis of the horn than the other edge. A double guide 125 maintains the proper relation of the two notched edges to the vertical axial plane of the horn.

From the position Fig. 8, the rounded body-blank is advanced stepwise by the feed-bars 87, 88, to the first hook-forming position, Figs. 9 and 14. At this position, one notched edge of the body-blank enters a notch 127 in a reciprocatory blade 129. The blade 129 is mounted at an oblique angle to the vertical plane passing through the axis of horn 44 so as to form a backwardly turned hook between the notches at this edge of the body-blank. The blade is reciprocated downwardly to form a hook, the edge of the body-blank projecting into the notch 127 the width of the hook to be formed, being bent down and back upon the outside of the body-blank against an anvil 130. After the hook is formed the notched blade 129 is reciprocated back into the position shown in Fig. 9, so as to be in position for hook formation on the succeeding body-blank. To insure space between the blade 129 and the edge of the body-blank opposite the edge being hook-formed, the horn 44 at this position may be formed with a segment 131 which may be adjusted by means of a screw 133 to increase (or decrease) slightly the circumference of the horn, and thereby adjust the separation of the adjacent edges of the body-blank. Numeral 130' designates a block of steel inserted in the horn 44 opposite the anvil 130.

From the position Fig. 9 (where the first hook is formed) the rounded body-blank is advanced stepwise by the feedbars 87, 88, to the second hook-forming position, Figs. 10 and 15. In this position, the edge of the body-blank with the hook formed thereon has been fed to a position where it is held out of the way of the second hook-forming means and in a position to subsequently interlock with the hook which is formed at this station. The horn 44 is provided with an anvil-rest 134 and an anvil 135, the upper side of the anvil 135 being provided with a grooved ledge 136 on which the already hook-formed edge of the body-blank is held. The horn at this position is formed with a segment 137, which, when set by adjustment and expanded, draws the body-blank around the horn, the hooked end being held by the grooved ledge 136, leaving projecting beyond the anvil 135 the proper margin on the body-blank to form the hook, and determining the diameter of the can-body to be formed. A reciprocatory blade 139 is mounted at an oblique angle to the vertical plane passing through the axis of the horn 44 so as to form a backwardly turned hook between the notches at this edge of the body-blank, the hook at this station being turned oppositely to the hook formed at the previous station; one hook is turned outwardly from the body-blank and the other turned inwardly. At this station the edge of the body-blank which is not as yet hook-formed, projects beyond the anvil the distance equal to the length of the hook to be formed, and when blade 139 is reciprocated, it bends the projecting notched edge of the body-blank up and back against the inside of the body-blank. After completing the hook-forming movement, blade 139 is reciprocated back to the position shown in Fig. 10, so as to be in position for hook-forming on the successive body-blank.

As the body-blank is advanced by the feedbars 87, 88, to the next position, a slope or cam 220 on the horn moves the end of the body-blank with the outwardly turned hook thereon outwardly to interlock with the inwardly turned hook on the opposite end of the body-blank, and the body-blank arrives at the next position with the hooks interlocked and ready to be formed into the side-seam by the bumper.

The position of the body-blank with reference to the vertical axial plane of the horn, as fixed by stop 122 or the double guide 125, or both, is maintained at the hook-forming positions and also at the side seam closing position Fig. 11, thus obviating circumferential shifting of the body-blank on the horn throughout its advance on the horn.

The blades 129, 139 (129', 139') are relatively short, are mounted in slide-ways 141, 143 (141', 143'), Figs. 1, 2 and 4, at an angle of about 45°, and have a short reciprocatory movement, the arrangement and operation occupying little space on each side of a vertical plane passing through the axis of horn 44 (and 44'), thereby enabling the horns 44, 44' of a duplex machine to be arranged very close together and the body-maker to be made very compact. The blades 129, 129', 139, 139', and the mechanisms for operating them can be made of an overall width not exceeding a horn diameter beyond each horn and equal to about the length of a body-blank for which the machine is designed, and the horns 44, 44' may be arranged less than a horn-diameter apart, thus bringing together toward the mid-plane of a duplex machine all of the mechanisms on either side of the horns and reducing the overall width of a duplex machine to substantially that of a present-day single line body maker for equal size can bodies. From the foregoing, it will be perceived that the invention enables compactness to be obtained in a multiple horn machine; for example, in a quadruplex machine, horns could be arranged over the inclined blades at about the same separation as the two horns of a duplex machine.

The blades 129, 129', 139, 139' are operated by suitable means in timed relation to the feed-bars 87, 88, 87', 88'. They may be advantageously operated by a single head-slide 149, Figs. 1 and 4, to which a short reciprocatory motion may be imparted by an eccentric connecting rod and eccentric 151 on shaft 14, for example. Short bell-cranks 153, 154, 153', 154' impart short motions to the blades 129, 139, 129', 139' through a simple engagement of a rounded end on each of the bell-cranks with a slot 157 in each of the blades. The bell-cranks 153, 153' are connected to the head-slide 149 by adjustable links 159, 159', and similar links 161, 161' connect the bell-cranks 154, 154'.

From the position, Fig. 10, where the second hook is formed on the body-blank, the blank is advanced stepwise by the feed-fingers 87, 88 (87', 88') to a position for closing the side-seam, shown in Figs. 11 and 16. In passing from the position where the second hook is formed to the side-seam closing position the two reversely formed hooks interlock as heretofore explained, and the said hooks are in interlocking position in said latter position. The horn in this position may have a segment 165 which may be expanded to bring the hooks into close engagement. The interlocked hooks of the body-blank lie below an anvil 167 carried by the horn. Below the anvil 167 is a reciprocatory hammer or "bumper" 169 (169'), which, when pressed against the interlocked hooks of the can-body-blank, presses them together against anvil 167 and closes or forms the side-seam of the can-body. The can-body is delivered from the body maker by the feed-fingers 87, 88 (87', 88'), and, when it is to be used for a so-called "slack" can, it goes to a flanger, and, when it is to be used for a tight can, it goes first to a soldering mechanism, which in practice is usually a so-called soldering attachment, the horn of which connects directly with the horn 44 (44') of the body maker.

Figure 3:
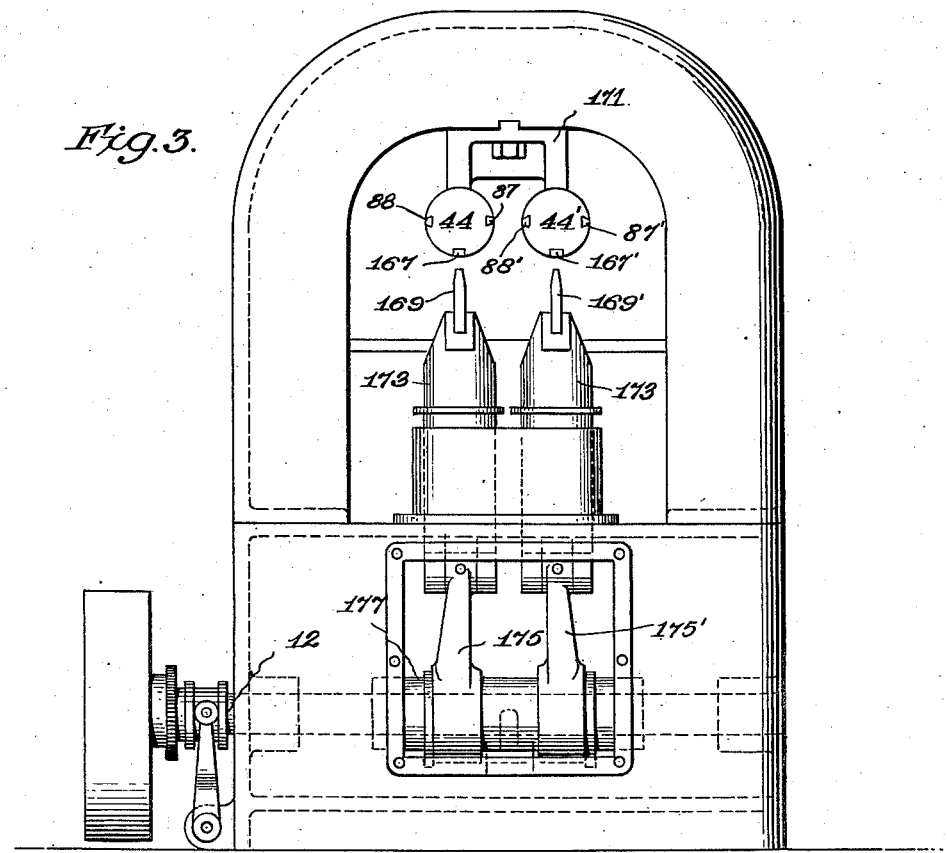
Fig. 3 is a view in elevation at the delivery end of the body-maker.

A support 171 Fig. 3, may be provided on the frame of the body maker for relieving the horn 44 from the strain applied by the bumper 169 (169').

The bumper or hammer 169 (169') may be mounted on a slide 173, which latter may be reciprocated in any suitable manner in timed relation to the feed-bars 87, 88 (87', 88') as by an eccentric strap 175 (175') and an eccentric 177 on shaft 12.

The expansion of the segments 137 and 165 of the horn may be effected in any suitable manner in timed relation to the feed-bars 87, 88 (87', 88'), an advantageous means for the purpose being wedge-pieces 181, 182, Fig. 19, housed in the respective parts of the horn at the second hook-forming position and at the side-seam closing position. The wedge-pieces 181 and 182 may be formed alike as opposites. Each has one or more inclined planes 185, 186 against which abut one or more pins 188, 189 adjustably fastened on the segments 137 and 165 respectively. Inclined faces 191, 192 are formed on the adjacent ends of the wedge-pieces 181, 182, and between these ends is a plug-wedge 195 having inclined faces which contact the inclined faces 191, 192 on wedge-pieces 181, 182. The wedge-plug 195 may be actuated by a tappet 197 adjustably mounted on an arm 199 carried by the slide 173 on which the bumper 169 is mounted. Springs 201, 202, press the wedge-pieces 181, 182 to initial position to collapse the segments 137 and 165 of the horn following the action of the wedge-plug 195, and the wedge-plug may itself be biased to initial position by a spring 204, the structure and arrangement being easily understood.

To provide clearance for the body-blank, as it is advanced stepwise by the feed-bars 87, 88, at the anvil 130 and the anvil-rest 134, the horn is given a slight lift equal to a few thicknesses of the sheet metal of which the body-blank is formed. For this purpose the horn 44 (44') may be mounted on a vertical slide 207, Fig. 1, to which a slight lift is imparted during the retraction movement of the feed-bars by suitable means, such for example as a bell-crank 209, links 211 and 213, and a cam (not shown) on shaft 22. Hold-down rails 215 (Figs. 4 and 12) running the length of the horn, may be provided for confining the body-blanks bent around the horn.

*Resume of Operation.*—The operation has been explained along with the description of the structure. It will be summarized here: Body-blanks are fed singly from hopper 40 by the action of the sucker 53 and reciprocatory feed-bars 57, 58, in a manner well understood in the art, advanced along the feed table to notchers 75, 76, where they are notched at opposite edges in a manner will understood for forming a locked side-seam, and from the notchers are advanced to a position to be fed onto and bent around the horn 44. Pushers 90 push the body-blanks transversely of the line of feed by fed-bars 57, 58, into the bite of feed-rollers 92, 93, which rotate at high speed and carry the body-blank around the horn. The oblique arrangement of the axes of these rollers initiates the bending of the body-blank from the edge, so that the rounding starts at the edge, and results in the formation of a reliable side-seam, particularly at the lapped portion, after the edge portions of the blank have been hook-formed, interlocked and bumped (closed). The stop 122 acts to position the body-blank circumferentially on the horn with one edge projecting beyond the vertical plane through the axis of the horn, to a length or amount of metal which is bent over to form a hook. The position of the blank circumferentially of the horn is such that the hooks, when subsequently formed thereon and interlocked, lie in the aforesaid mid-plane which passes through the axis of the horn.

From the bending and wrapping position (Fig. 7) the body-blank may be advanced to a position where its circumferential position on the horn is further determined and set by a double guide 125, though this may not always be necessary.

The notched body-blank is then advanced to a hook-forming station, or stations (Figs. 9 and 10). At the station illustrated in Fig. 9, a marginal portion of the body-blank extends beyond an anvil 130 under an overhanging part which may be in the form of a recessed portion 127 in a blade 129, which, when reciprocated, forms an outwardly turned hook on the body-blank. At the next station, illustrated in Fig. 10, a marginal portion of the body-blank projects beyond an anvil 136, and when the blade 139 is reciprocated, an inwardly turned hook is formed. At this station the previously formed hook rests in a groove 136 on top of anvil 135. The hook resting in groove 138 is later cammed out by the contour of the horn into interlocking position with the hook which is formed at this (Fig. 10) station. The horn may also be provided with an expander, the action of which is to determine very accurately (and thereby make uniform) the circumferential size of the can-bodies.

As the body-blank is advanced beyond the hook-forming positions, the hooks are interlocked by a cam-formation 220 on the horn, and come to rest beneath an anvil 167, and here the side seam is closed by the action of the hammer or bumper 169 on the interlocked hooks between the hammer and anvil. An expander 165 on the horn brings the hooks close together with the body held at the determined diameter and circumference of the finished can-body.

The body-blank, with the side-seam closed, may be then forwarded to other mechanisms, such as solderers, flangers, etc.

The one-time positioning of the body-blank circumferentially of the horn and the short motions of the moving parts of the hook-forming mechanisms favor the easy working of the machine at high speeds.

What is claimed is:

1. A can-body maker, comprising a longitudinally extending horn, means for wrapping a body blank around the horn and positioning it for having a hook of designed width formed thereon at the first hook forming station, an anvil at the first hook forming station and a co-acting reciprocatory blade for forming a first hook, and means for advancing the body blanks step wise along the horn from the first to a second hook forming station, a second anvil at the second hook forming station, having a grooved ledge on its inner side against which said first hook rests in a position to interlock with the second hook when the body-blank is moved away from the second hook forming station, means for expanding a body blank, with the first hook held by said grooved ledge to draw the body blank to a position in which the second side edge extends beyond the second anvil, an amount equal to the width of the second hook, a blade coacting with said second anvil for forming the second hook, and means for guidedly moving said hooked body blank along the horn from said second hook forming station, thereby to cause the hooks to interlock.

2. A can-body maker, according to claim 1 wherein said positioning means comprises a guide acting to guide the body blank to a position on the first anvil in which a side edge extends an amount corresponding to the determined width of a hook.

3. A can-body maker, according to claim 1 wherein said first hook forming blade has a recess therein for receiving the edge of a body blank of a width corresponding to the width of the first hook.

4. A can-body maker, according to claim 1 wherein said horn, at said first hook forming position, has an adjustable segment.

PETER KRUSE.

REFERENCES CITED

The following references are of record in the file of this patent:

UNITED STATES PATENTS

| Number | Name | Date |
|--------|------|------|
| 12,375 | Eldridge (Reissue) | Aug. 1, 1905 |
| 381,696 | Hirsch | Apr. 24, 1888 |
| 382,537 | Leavitt | May 8, 1888 |
| 495,426 | Murch | Apr. 11, 1893 |
| 641,999 | Puddefoot | Jan. 23, 1900 |
| 864,325 | McDonald | Aug. 27, 1907 |
| 1,475,399 | Kronquest | Nov. 27, 1923 |
| 1,625,091 | Peters | Apr. 19, 1927 |
| 1,710,002 | Pearson | Apr. 23, 1929 |
| 1,990,579 | Adams | Feb. 12, 1935 |
| 2,135,579 | Johnson | Nov. 8, 1938 |
| 2,265,187 | Murch | Dec. 9, 1941 |
| 2,353,728 | Hubbell | July 18, 1944 |

FOREIGN PATENTS

| Number | Country | Date |
|--------|---------|------|
| 638,323 | Germany | Nov. 21, 1936 |